United States Patent
Wendenburg et al.

(10) Patent No.: US 7,039,616 B2
(45) Date of Patent: May 2, 2006

(54) METHOD FOR PROOF OF TRANSACTION

(76) Inventors: Jan Wendenburg, Im Pastoratsbush 16, Bochum (DE) 44797; Percy Dahm, Schieferbergstr. 23, Castrop-Rauxel (DE) 44755

( * ) Notice: Subject to any disclaimer, the term of this patent is extended or adjusted under 35 U.S.C. 154(b) by 827 days.

(21) Appl. No.: 10/095,113

(22) Filed: Mar. 12, 2002

(65) Prior Publication Data
US 2002/0156748 A1     Oct. 24, 2002

(30) Foreign Application Priority Data
Mar. 12, 2001 (DE) ................. 101 12 166

(51) Int. Cl.
*G06F 17/60* (2006.01)
(52) U.S. Cl. ............... 705/64; 705/37; 705/80; 705/74; 705/75; 705/76; 380/30; 707/10
(58) Field of Classification Search ........... 705/37, 705/50–80; 380/30; 707/10
See application file for complete search history.

(56) References Cited

U.S. PATENT DOCUMENTS

| | | | |
|---|---|---|---|
| 5,018,196 A | | 5/1991 | Takaragi et al. |
| 5,835,896 A | * | 11/1998 | Fisher et al. ................. 705/37 |
| 6,072,870 A | * | 6/2000 | Nguyen et al. ............... 705/79 |
| 6,199,052 B1 | | 3/2001 | Mitty et al. |
| 6,260,024 B1 | * | 7/2001 | Shkedy ......................... 705/37 |
| 6,327,578 B1 | * | 12/2001 | Linehan ........................ 705/65 |
| 6,343,284 B1 | * | 1/2002 | Ishikawa et al. .............. 705/67 |

FOREIGN PATENT DOCUMENTS

| | | | |
|---|---|---|---|
| EP | 0 969 430 A | | 1/2000 |
| WO | WO 00/58895 | * | 10/2000 |
| WO | WO 01/04816 | * | 1/2001 |
| WO | WO 01/86538 A1 | | 11/2001 |

OTHER PUBLICATIONS

Watanabe et al, "Reducing the Round Complexity of a Sealed-Bid Auction Protocol with an Off-Line TTP", ACM, 2000.*

Herda Siegfried, "Non-Repudiation: Constituting evidence and proof in digital cooperation," Computer Standards and Interfaces, Elsevier Sequoia, Lausanne, Ch. Bd. 17, Nr. 1, 1995, pp. 69-79, XP 000611337.

* cited by examiner

*Primary Examiner*—James P. Trammell
*Assistant Examiner*—Jalatee Worjloh
(74) *Attorney, Agent, or Firm*—Banner & Witcoff, Ltd.

(57) ABSTRACT

A method for proof of the time and content of transactions in a digital network is described.

A digital form is requested by a customer's computer (1) and is transmitted from a bid server (3) to the customer's computer (1) and such contains the network address of a transaction proof server (4).

Form data in the form, includes the data required for acceptance of the bid, and are sent to an order acceptance server.

The form data are sent from the customer's computer (1) to the transaction proof server (4), and are provided with a digital time specification.

A check digit code is generated for the form data and the digital time specification, and this check digit code is encoded with a key to form a time signature.

The form data are transmitted from the transaction proof server (4) with the digital time specification and the time signature to the order acceptance server.

20 Claims, 1 Drawing Sheet

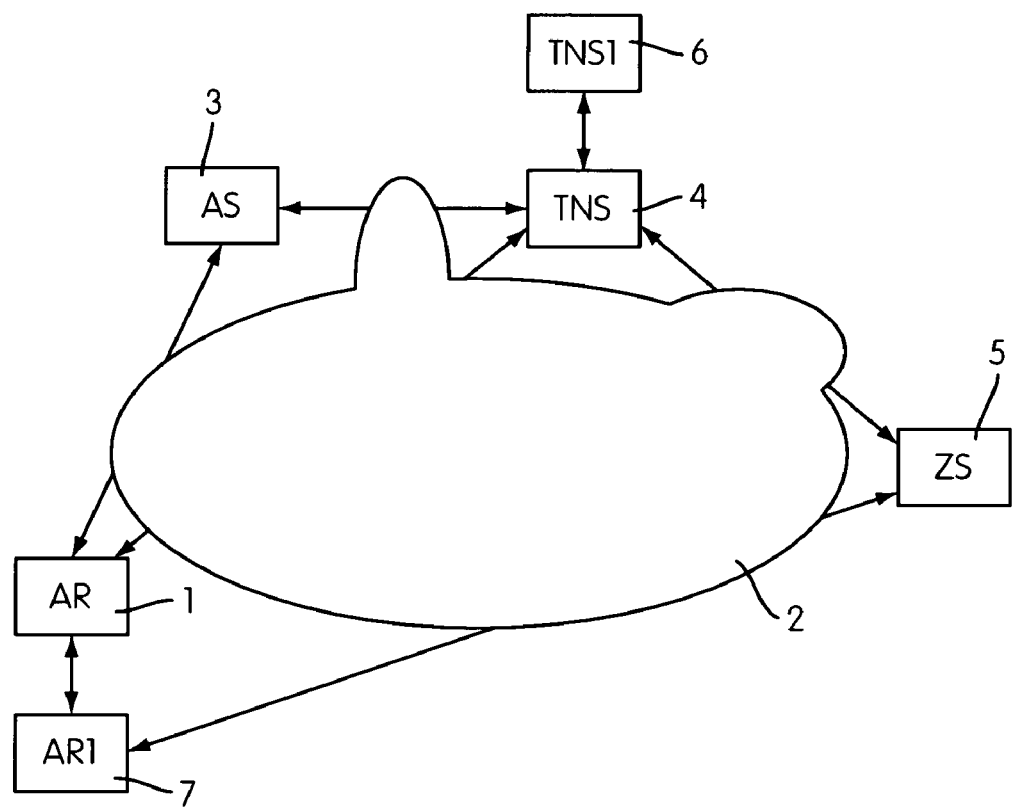
FIGURE

METHOD FOR PROOF OF TRANSACTION

FIELD OF THE INVENTION

The invention relates to a method for proof of transactions in a digital network, especially on the internet, where the acceptance of a bid presented via a bid server takes place by means of the fact that
 a) a digital form is requested from the bid server by a customer's computer connected to the network,
 b) the form is transmitted from the bid server to the customer's computer and
 c) the form data entered in the form, which comprise the data required for acceptance of the bid, are sent back to an order acceptance server.

When orders are placed via the internet, there can be some dissent between the customer and the supplier as to which time which order has been placed. Thus, systems are being developed with which the customer can be identified when the order is placed and proof of the content of the order can be furnished.

BACKGROUND OF THE INVENTION

Thus, for example, for the transaction of transfer orders on the internet, there are known online banking systems where the customer logs onto a bank server via his internet browser by giving the name and a password, then, by selecting a menu point on the internet pages of the bank server, requests a transfer form which is then sent to him from the bank server and which, after filling in the form quoting a transaction key, a so-called TAN number, he can then authorise as a transfer order and send to the bank server. The network address to which the transfer order is to be returned is contained in the form as a so-called hyperlink which is then activated if the customer, for example, selects the graphic OK switch (OK button) to conclude the transfer order. From the bank server the customer then receives a confirmation that the order is being processed further.

Similar systems are available for example for ordering products over the internet but then the order does not usually need to be authorised via a transaction number.

A disadvantage of these systems is that they are expensive to program and must be adapted to the server structure of the particular internet provider. Such adaptation is cost-intensive. There is also the disadvantage that it is difficult for the supplier and also for the customer to provide reliable proof of the time and content of the order since the data available at the supplier and in some cases, also at the customer can be manipulated after the event and the data sent over the internet has little value as evidence.

Against this background, the object of the present invention is to provide a method which can provide proof of the time and content of orders placed via the digital network and requires comparatively little programming expenditure.

This object is achieved by a method of the type specified initially whereby
 d) the form sent from the bid server to the customer's computer contains the network address of a transaction proof server,
 e) the form data are sent from the customer's computer to the transaction proof server,
 f) the form data are provided with a digital time specification,
 g) at least one check digit code is generated for the form data and the digital time specification and this check digit code is encoded with a key to form a time signature, and
 h) the form data are transmitted from the transaction proof server together with the digital time specification and the time signature to the order acceptance server.

SUMMARY OF THE INVENTION

Here and subsequently check digit codes are understood as data sequences which can be generated from a data set or a file by using a particular algorithm and which uniquely identify the data set or the file. Such data sets are also known as hash codes. They are generally comparatively small compared with the data sets or files and have a standard length, for example, a length of n bits. As a result of its smaller and uniform size, a data processing program can work more easily and quickly with such a data sequence compared with the complete file or the complete data set when the identification of data sets is involved.

The basic concept of the invention is that an encrypted time signature is generated and stored together with the order data, wherein the time signature for the order data and the digital time specification at the time of generating the time signature is unique. Since the time signature is encrypted, it cannot be changed without it also being made unusable at the same time. Suitable encryption methods may especially include the method known as PGP (Pretty Good Privacy) or comparable methods where a digital data packet is encrypted with a so-called private key and can be decrypted again using a corresponding public key.

The time specification in particular contains the date and if desired, also includes the time, either as local time or in world time format (UTC), when the order is transmitted and/or the time when the time signature is generated.

If, at a later time, proof is to be furnished that the order data present at a later time after the order has been placed correspond to the time signature attached to it, the signature can be decrypted so the originally generated check digit code is obtained. The original check digit code can then be compared with a new check digit code which is generated from the present order data and the digital time specification by using the same algorithm. If the original and the new check digit code agree, the desired proof is furnished.

This proof will always fail if at least one of the data packets which form the basis of the signature has changed, whether it be the order data or the time specification since the check digit code contained in the time signature can no longer be generated from the modified data packets. This proof will also fail if the signature has been manipulated, since it can no longer be decrypted. This applies at least for all encryption methods where a private key is used for encryption as long as this private key is not known to the customer or the supplier.

The latter is particularly the case if the operator of the transaction proof server is independent of the supplier.

Another advantage of the method is that the time signature is generated before acceptance of the order and independently thereof. In this way it is impossible for the supplier to manipulate the order data after receipt of the order and before confirmation of the order. Thus, in the event of a successful proof of the time and content of the order, both the customer and the supplier can reliably assume that the order data corresponds to that transmitted by the customer.

Thus, the method according to the invention makes it possible to prove that an order having a particular content has been placed at a particular time.

At the same time, the method of proof does not require any far-reaching incursion into the server structure of the supplier. If the transaction proof server is used exclusively in connection with an order acceptance server, i.e., if the transaction proof server transmits all the order data transmitted to it exclusively to an order acceptance server of the supplier, it is sufficient if the digital form that the supplier provides for placing the order contains the network address of the transaction proof server. If the transaction proof server is used in connection with a plurality of order acceptance servers of one or several suppliers for proof of orders, the digital form sent from the bid server must also contain the network address of the order acceptance server responsible for the order or other details which identify this order acceptance server.

In this context the order acceptance server is understood as a computer connected to the network which takes over the task of accepting the order at the network provider. This task can also be performed at the bid server, if necessary, so that the bid server is also at the same time the order acceptance server.

As a result it is merely necessary to modify the data in the digital form without further transaction procedures being required to place the order on the bid server or the order acceptance server. Thus, the method of proof can be used for a plurality of bid and order acceptance servers.

In a preferred embodiment of the method, the form sent by the bid server to the order acceptance server contains the network address of the order acceptance server. As already mentioned above, it is hereby possible for the transaction proof server to process orders for a plurality of order acceptance servers of one or several suppliers with one time signature in the fashion according to the invention wherein it transmits the respective form data together with the time specification and the time stamp signature to the order acceptance server specified therein.

Here it is particularly advantageous to uniquely prove the customer's identity if the form data is provided with a digital signature before it is sent to the transaction proof server. Such a signature can be provided at the customer's, for example, by means of a smart card system or, as another example, at the customers there is provided a signing server connected to the customer's computer, to which the form data to be provided with the signature is transmitted from the customer's computer for signing and the form data provided with the signature is sent back to the customer's computer.

In this context, it can also be advantageous if the form data is only released for sending to the transaction server if it contains the digital signature which identifies the customer. Since the forms themselves generally contain small computer programs (for example, ActiveX components or Java script) or standardised operating instructions for other computer programs, it is possible, for example, that the network address of the transaction proof server contained in the form is only made available for transmission of the form data if the form has been filled out completely and the form data is provided with a digital signature.

In order to avoid an order without a customer-identifying signature or with an incorrect signature nevertheless being transmitted to the order acceptance server, it is also recommended that the transaction proof server should check whether the form data is provided with a digital signature of the customer and the form data is sent back to the customer's computer if the digital signature is missing or there is an error therein.

It can also be advantageous if the transaction proof server checks whether the customer or a certificate contained in the digital signature which identifies the customer, is contained in a customer data base. Thus, it is feasible that every customer must be registered at the transaction proof server before he can transact an order via this server. The particular advantage is that by means of registration, every customer can be identified as known before an order is accepted. It thus becomes possible for the acceptance of an order to be refused by the transaction proof server if it is known that the customer has previously abused the order system and closed customer groups can be formed, for example, for the transaction of orders as part of the cooperation between a producing company and its subcontractors, for example in the car industry.

In another preferred embodiment of the method the transaction proof server provides the form data with a signature which identifies the transaction proof server. By this means proof can later be provided as to where the form data was processed and which route was taken by the form data up to acceptance of the order.

It is particularly advantageous if the transaction proof server redirects the form data to a certification server which generates a time stamp certificate as a time signature for the form data and sends back the time stamp certificate to the transaction proof server. Such certification servers are known. They are used to provide digital data with a forge-proof time stamp to allow forge-proof authentfication of data in accordance with the signature law shortly to come into force in Germany. If data are signed by such a certification server, proof of the completeness and time of existence of the data furnished hereby is recognised as evidence in legal disputes. The structure and mode of operation of such certification servers is described by Dr. Matthias Meinhold, for example, in the Journal c'T, issue August 1998 under the title "Real-time certificate".

The method of proof is especially transparent for the customer if the data transferred to the bid server is stored in the network such that it is accessible to the customer. The customer thus has the possibility of calling up the form data at any time together with the time signature in order to furnish proof of the time and content of the order placed by him.

For the same purpose the data transferred to the bid server can be transmitted to the customers computer after time signing has been completed.

The storing of data in the network or the transmission of data to the customer's computer should preferably be performed by the transaction proof server but can also be executed by the order acceptance server.

If the data are not made available to the customer after the time signing following placement of the order, proof of the time and content of the order can only be furnished by the supplier.

In order to make the placing of the order transparent for the customer especially in this case, in a preferred embodiment of the method the order acceptance server transmits an order confirmation to the transaction proof server and the transaction proof server redirects the order confirmation to the customer's computer.

The invention is explained subsequently with reference to a schematic diagram which shows a preferred arrangement of different computers and servers within the scope of the invention.

BRIEF DESCRIPTION OF THE FIGURE

FIG. 1 shows a customer's computer 1 which is connected via the internet 2 to a bid server 3 of an internet provider and a transaction proof server 4. The transaction proof server 4 is also connected to the bid server 3 and additionally via the internet 2 to a certification server 5.

DETAILED DESCRIPTION OF THE INVENTION

The transaction proof server 4 has means 6 for generating a digital signature which identifies it and likewise the customer's computer 1 has means 7 for generating a customer-identifying signature.

If the customer would like to accept the offer of the internet provider, he requests a digital form for placing the order from the bid server 3 with a so-called "Request" using browser software via the customer's computer 1. As a response to this, the bid server 3 transmits the digital form to the customer's computer 1 with a so-called "Response". On the basis of the form data, entry fields for filling out the form with the order data are then displayed to the customer by the browser software.

After the customer has filled out the form using his order data, the form data, he adds to this a signature to identify himself or the company placing the order by using the means 7 for generating a signature.

In particular, smart card systems can be used as the means 7 wherein the smart card can be a plastic card bearing a computer chip which contains a unique digital key for the customer. The generation and attachment of the customer's signature can either be made directly at the customer's computer or within a company as the customer, via a signature server to which the customer's computer can have access. Especially in company networks with their own signature server it may be appropriate, if necessary, if the signed data together with the signature is linked with a real-time certificate which is requested from a certification server. By this means the placing of orders within companies can also be recorded with high evidence value.

Instead of using smart card systems it is also possible to use other identification systems, for example, those which generate the signature by using a fingerprint of the, person placing the order or by using other unique physical characteristics which uniquely identify the customer, such as facial features, the iris of an eye, or similar. Such identification and signature systems are available on the market and are sufficiently well known.

After signing has been completed, the customer dispatches the form data by confirming the entry of the form data, for example, by pressing an OK switch (OK button). The digital form can be provided with software instructions such that entry of the form data can only be confirmed if the form has been filled in completely and/or the customer-identifying signature has been attached.

The digital form transmitted by the supplier to the customer contains the network address of a transaction proof server 4. The form data are then sent to this transaction proof server 4 as a request after their entry has been confirmed by the customer's computer 1.

After the transaction proof server 4 has received the form data, the transaction proof server 4 checks whether the form data contain a valid signature of the customer. During this check it can also be established by interrogating a customer data base whether the customer is registered in the transaction proof system.

If the test criteria are not satisfied or not completely satisfied, the transaction proof server 4 sends the form data back to the customer's computer 1 as a response, if necessary, specifying the error. If all the test criteria are satisfied, the transaction proof server 4 provides the form data with a signature using the means 6 for generating a signature which identifies it, and requests the certification server 5 for a time stamp certificate as a response.

For this purpose the transaction proof server 4 can, for example, transmit all the form data, if necessary with the signature identifying the transaction proof server 4, in its entirety to the certification server 5. In this case, the certification server 5 generates a first check digit code for the data transmitted to it, links the first check digit code to a digital time specification generated by the certification server, creates a second check digit code on the basis of the first check digit code and the digital time specification and encrypts these two check digit codes with a private key to form a time stamp signature. The data transmitted by the transaction proof server 4 together with the first check digit code, the digital time specification and the time stamp signature are then sent back to the transaction proof server 4 as a response.

It is also possible for the transaction proof server 4 itself to generate a first check digit. code on the basis of the form data and, if necessary, the signature which identifies it, and transmit merely the first check digit code to the certification server 5, and the certification server 5 then generates the time stamp signature in a suitable fashion and sends back the time stamp signature together with the first check digit code and the digital time specification to the transaction proof server 4 as a response.

The transaction proof server 4 then transmits the form data together with the first check digit code, the digital time specification and the time stamp signature to an order acceptance server as a request, in the present case the bid server 3, which also makes available the function of the order acceptance server. The network address of the bid acceptance server is already contained in the digital form transmitted from the bid server 1 to the customer's computer and is sent together as a component of the form data so that the network address of the order acceptance server is known to the transaction proof server at the time of processing the form data.

If the form data are completely received at the order acceptance server, the order acceptance server sends back an order entry confirmation as a response to the transaction proof server 4 which also redirects the order entry confirmation as a response to the customer's computer 1. The order entry confirmation can, but must not necessarily contain all the data input at the order acceptance server, especially the form data together with the time signature and the first check digit code.

In a slightly modified embodiment of the method, the order entry confirmation sent from the order acceptance server is not redirected by the transaction proof server 4 to the customer's computer 1 as a response but merely a copy of the form data transmitted to the order acceptance server together with the first check digit code, the digital time specification and the time stamp signature, or merely a brief confirmation of receipt of the form data transmitted by the customer's computer 1 to the transaction proof server 4. By this means the customer certainly has no guarantee that the order has been entered at the supplier but in any case, he has the certainty that at the time of transaction of the order there is a possibility of proving the time and content of the order. This simplified procedure is particularly suitable for the transaction of orders with end customers who generally do not have the desire nor even the possibility of archiving all the orders. In this case, it is possible especially for the supplying company to prove that the order has been executed as placed by the customer.

In any case, the supplier and if necessary the customer has access to all the data required to prove the time and content of the order placed by the customer. For proof it is merely necessary to decrypt the time stamp signature using the public key of the certification server 5, determine a new first and second check digit code from the available order data, if appropriate, the signature of the transaction proof server 4 and the digital time specification, and compare these new check digit codes with the check digit codes created at the time of placing the order. If the check digit codes agree, the present order data also agree with the order data which had existed at the time of placing the order.

The invention claimed is:

1. A method for proof of transactions in a digital network, especially on the internet, where the acceptance of a bid presented via a bid server comprises:
    a) a digital form is requested from the bid server by a customer's computer connected to the network,
    b) the digital form is transmitted from the bid server to the customer's computer and
    c) form data which comprises the data required for acceptance of the bid, are sent to an order acceptance server, wherein
    d) the form sent from the bid server to the customer's computer contains the network address of a transaction proof server,
    e) the form data are sent from the customer's computer to the transaction proof server,
    f) the form data are provided with a digital time specification,
    g) at least one check digit code is generated for the form data and the digital time specification, and this check digit code is encoded with a key to create a time signature, and
    h) the form data are transmitted from the transaction proof server together with the digital time specification and the time signature to the order acceptance server.

2. The method according to claim 1, wherein the digital form sent from the bid server to the customer's computer contains the network address of the order acceptance server.

3. The method according to claim 1, wherein the form data, before being sent to the transaction proof server, is provided with a digital signature which identifies the customer.

4. The method according to claim 3, wherein the form data are only released for transmission to the transaction proof server if the form data contain the digital signature which identifies the customer.

5. The method according to claim 4, wherein the transaction proof server checks whether the form data is provided with an error-free digital signature of the customer and the form data is sent back to the customer's computer if the digital signature is missing or there is an error in this signature.

6. The method according to claims 3, wherein the transaction proof server checks whether the customer or a certificate contained in the digital signature which identifies the customer, is contained in a customer data bank.

7. The method according to claim 1, wherein the transaction proof server provides the form data with a signature which identifies the transaction proof server.

8. The method according to claim 1, wherein the transaction proof server redirects the form data to a certification server which generates a time stamp certificate as a time signature for the form data and sends the time stamp certificate back to the transaction proof server.

9. The method according to claim 1, wherein the data transmitted to the order acceptance server is stored in the network such that it is accessible for the customer.

10. The method according to claim 1, wherein the data transferred to the order acceptance server is also transmitted to the customer's computer.

11. The method according to claim 1, wherein the order acceptance server transmits a confirmation of the receipt of the form data to the transaction proof server and the transaction proof server redirects the confirmation to the customer's computer.

12. The method according to claim 2, wherein the form data, before being sent to the transaction proof server, is provided with a digital signature which identifies the customer.

13. The method according to claim 3, wherein the transaction proof server checks whether the form data is provided with an error-free digital signature of the customer and the form data is sent back to the customer's computer if the digital signature is at least one of missing and there is an error in this signature.

14. The method according to claim 4, wherein the transaction proof server checks whether the customer or a certificate contained in the digital signature which identifies the customer, is contained in a customer data bank.

15. The method according to claim 5, wherein the transaction proof server checks whether the customer or a certificate contained in the digital signature which identifies the customer, is contained in a customer data bank.

16. The method according to claim 3, wherein the transaction proof server provides the form data with a signature which identifies the transaction proof server.

17. The method according to claim 16, wherein the transaction proof server redirects the form data to a certification server which generates a time stamp certificate as a time signature for the form data and sends the time stamp certificate back to the transaction proof server.

18. The method according to claim 3, wherein the order acceptance server transmits a confirmation of the receipt of the form data to the transaction proof server and the transaction proof server redirects the confirmation to the customer's computer.

19. A method for proof of transactions in a digital network, especially on the internet, where the acceptance of a bid presented via a bid server comprises:
    a) transmitting a digital form from the bid server responsive to a customer request, the form data entered in the form, the form data which comprises the data required for acceptance of the bid, are sent to an order acceptance server, wherein
    b) the form sent from the bid server responsive to the customer request containing the network address of a transaction proof server,
    c) the transaction proof server via the network address, receiving the form data from a customer, responsive thereto:
    d) providing the form data with a digital time specification; and e) generating at least one check digit code for the form data and the digital time specification, and the check digit code is encoded with a key to create a time signature, f) transmitting the form data from the transaction proof server together with the digital time specification and the time signature to the order acceptance server.

20. The method according to claim 19, wherein the form data is provided with a digital signature which uniquely identifies the customer, prior to being received by the transaction proof server.

* * * * *